G. A. STARR.
PUMP.
APPLICATION FILED SEPT. 7, 1909.
961,039.
Patented June 7, 1910.
2 SHEETS—SHEET 1.
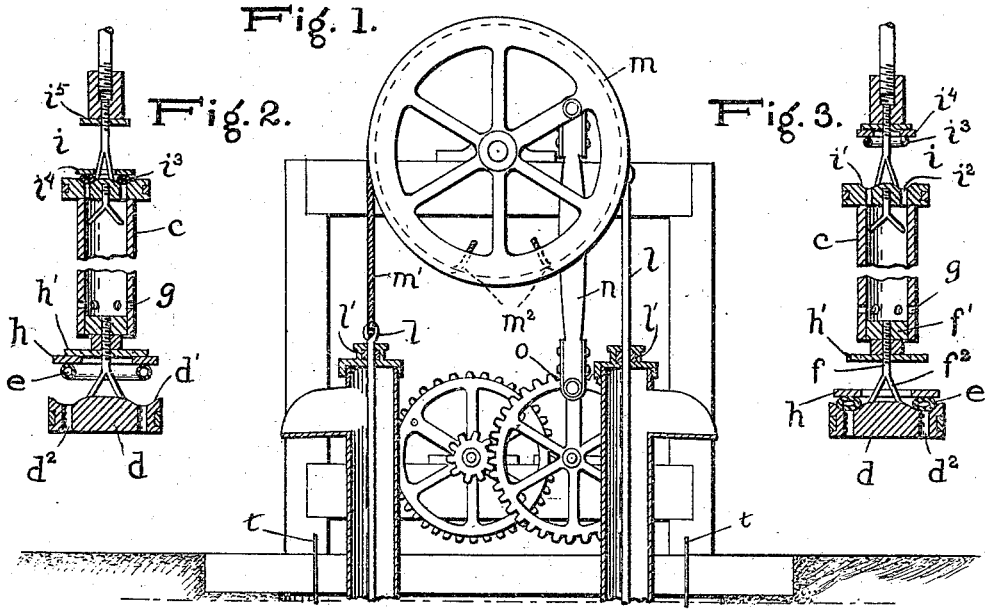
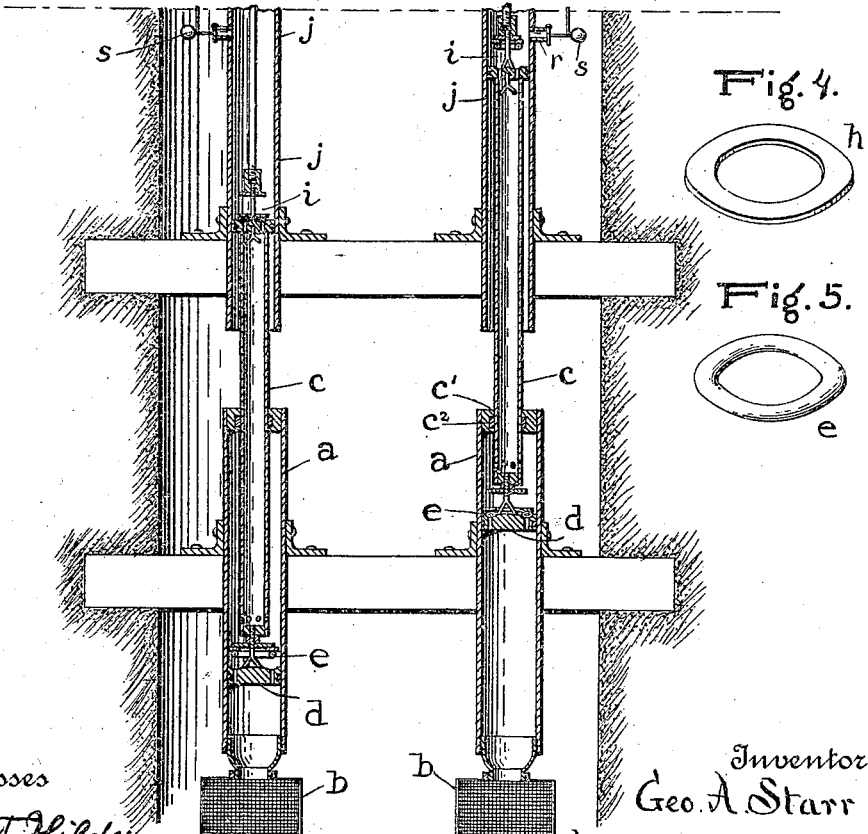
Witnesses
Stuart Hilder.
Frances M. Anderson.
Inventor
Geo. A. Starr
by E. W. Anderson & Son
his Attorneys

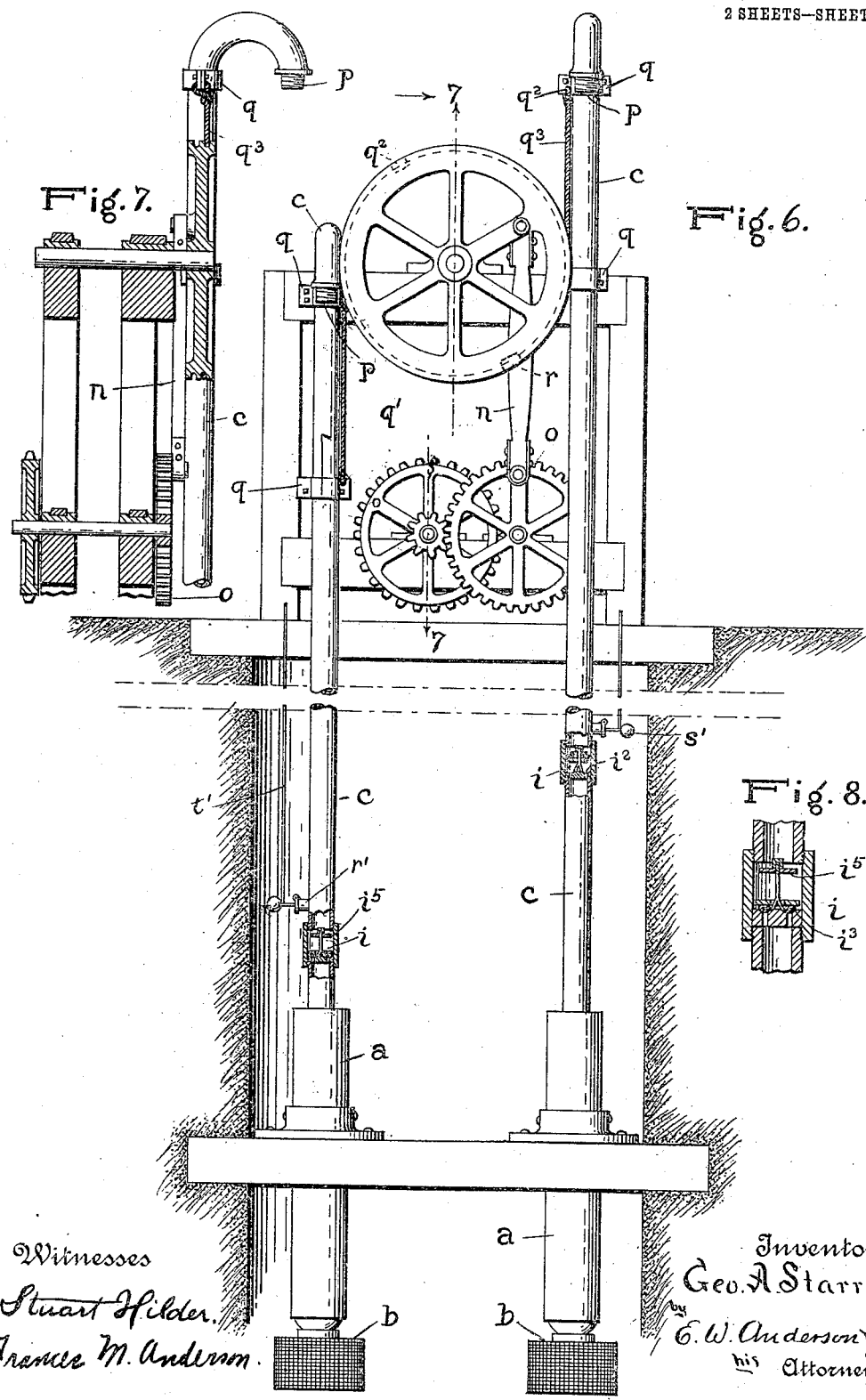

UNITED STATES PATENT OFFICE.

GEORGE A. STARR, OF FALLS CITY, OREGON.

PUMP.

961,039.

Specification of Letters Patent.  Patented June 7, 1910.

Application filed September 7, 1909.  Serial No. 516,488.

*To all whom it may concern:*

Be it known that I, GEORGE A. STARR, a citizen of the United States, resident of Falls City, in the county of Polk and State of Oregon, have made a certain new and useful Invention in Pumps; and I declare the following to be a full, clear, and exact description of the same, such as will enable others skilled in the art to which it appertains to make and use the invention, reference being had to the accompanying drawings, and to letters and figures of reference marked thereon, which form a part of this specification.

Figure 1 is a central vertical section of the invention as applied and partly broken away. Fig. 2 is a central vertical section of the inlet and outlet valves on a larger scale, the valves being shown as one open and one closed. Fig. 3 is a similar view with the valves oppositely positioned. Fig. 4 is a detail perspective view of one of the washers for the valve rings. Fig. 5 is a similar view of one of the loose valve rings. Fig. 6 is a side view partly broken away of a modified form of the invention as applied. Fig. 7 is a section on the line 7—7, Fig. 6. Fig. 8 is a detail sectional view on a larger scale of the outlet check valve for the modified form of the invention.

The invention has relation to pumps, having for its object the provision of an improved pump which will be balanced in its action, being an improvement upon the balance pump of my Patent Number 665,807, granted January 8, 1901, and it consists in the novel construction and combinations of parts as hereinafter set forth.

In the accompanying drawings, illustrating the invention, the letters $a$, $a$, designate the pump cylinders, two of which are employed, and the lower ends of which have each a perforated screen box $b$.

$c$, is a hollow piston rod working in each cylinder $a$, and having sliding bearings $c'$, in a stuffing box $c^2$, at the upper end of said cylinder, said rod having a piston head $d$, working in the cylinder and having an annular concave valve seat $d'$, provided with perforations $d^2$, and with which a valve ring $e$, of circular cross-section formed of soft rubber or other suitable material is normally in engagement. This valve ring is preferably hollow.

The hollow piston rod is connected with the piston head by a stem $f$, extending from the closed bottom $f'$, of the piston rod and having outward extending branches $f^2$, connected with the head. Perforations $g$, are formed in the piston rod walls just above its closed bottom.

A flat washer annulus $h$, is located above the valve ring, aiding in pressing down the valve ring to its seat to form a watertight joint. Upon upward movement of the valve and washer a spider-form check $h'$, carried by the stem $f$, contacts with the washer and prevents further rise of the valve.

At the upper end of the hollow piston rod $c$, is provided an upper piston head $i$, working in the standpipe and having an annular concave valve seat $i'$, having perforations $i^2$, communicating with the interior of the hollow piston below and with the standpipe above, a loose valve ring $i^3$, having engagement with said seat to close the valve perforations. A flat annular loose washer $i^4$, and a check $i^5$, are provided above the loose valve ring as in the valve for the lower piston head. Thus upon upward movement of the hollow piston rod and its piston head a vacuum will be created, causing the water to rise in the cylinder through atmospheric pressure, the valve $e$, being closed, and upon the down stroke the valve $e$, will open to admit the water in the cylinder above the piston head and into the interior of the hollow rod $c$, through perforations $g$, the valve $i$, being held closed by the weight of the water in the standpipe above it. Upon the upstroke again the valve $e$, will close, and the water will rise in the cylinder below the piston head, while the valve ring $i^3$, will open and the load of water above the piston head will pass through the perforations $i^2$, into the standpipe above the upper piston head.

The standpipe $j$, extends upward to the point of discharge, a connecting rod $l$, having sliding bearings in a stuffing box $l'$, at the upper end of the standpipe and having attachment at its lower end to the hollow piston rod.

The two standpipes $j$, $j$, have a balance wheel $m$, between the same, a flexible connection $m'$, extending over said wheel and having attachment at one end of the wheel at $m^2$, and at its other end to a rod $l$. Thus two flexible connections or ropes $m$, are required for the two pumps.

The balance wheel, which is designed to be turned back and forth in a vibratory manner, may be operated in any suitable manner, as for instance by means of a connecting rod *n*, having a power connection at *o*.

In Fig. 6 of the drawings is shown a modified form of the invention, designed for use for light domestic purposes, and wherein the standpipes are omitted and the hollow piston rods extended upwardly to the surface of the earth, having discharge nozzles at *p*. An upper check valve $i^3$, is employed in the hollow piston rod as in the form of the invention first described, the valve seat perforations and upper stop or check having similar reference letters applied thereto. *q*, *q*, represents rope clamps upon each hollow piston rod extension, the rope *q'*, passing over the balance wheel being made fast thereto at one end at $q^2$, and having the opposite end thereof connected with the rope clamp to pull upward upon the hollow rod. A second rope $q^3$, passes under the balance wheel in the opposite direction, having one end fast to the wheel at *r*, and its opposite end connected to the upper rope clamp *q*, to pull downward upon the hollow rod.

If the water is to be carried any distance from its point of discharge for the pump, hose or pipe may be readily laid for this purpose and connected to the standpipes. It will be noted that the loads of water in the two pumps balance each other, and that friction in my pump is reduced to a minimum.

In the form of pump first described, which is designed for heavy work such as irrigation purposes, the weight of the hollow piston, the piston head etc. is relied upon to cause the downward movement of the piston head and the rise of the water thereabove. The rod *l*, connecting the hollow piston rod with the operating mechanism may be dispensed with and the rope or cable extended downward and connected with the hollow rod, if desired, in a deep shaft.

A walking beam such as shown in my patent hereinbefore referred to may be substituted for the balance wheel.

A waste cock *r*, is provided in each standpipe above the outlet port and valve of the upper piston head, said cock being held closed by the weight *s*, and being designed to be opened by the upward extending operating cord or wire *t*, when it is desired to drain the water from the standpipe. A similar waste cock is provided above the outlet check valve in the modified form of the invention shown in Figs. 6 and 7 of the drawings, having similar letters of reference applied thereto, differentiated by the exponent "'."

In sinking a well or shaft where there is a large volume of water and it is also necessary to blast rocks, the cylinder need not be placed in the water, but may be secured as far above the water as is necessary within the limit of atmospheric action, and flexible section hose (not shown) may be connected to the lower ends of the cylinders. When it becomes necessary to blast, the hose may be removed. After the blast, the cylinders may be submerged to any depth.

For drilled wells, or for light domestic purposes, but one of the cylinders may be employed. In the case of drilled wells, especially where the bore is not large enough to admit of two cylinders, a single-cylinder pump of this character with a counterbalance attachment will be found of great value.

Having thus described my invention, what I claim as new and desire to secure by Letters Patent is:

1. In a pump, a cylinder having a closed upper head, an inlet port, a lower piston head working in said cylinder and having inlet ports and a valve device controlling the same, a standpipe, a tubular piston rod having means of connection with said head located centrally of the head within said valve device, said rod having communication at its lower end portion with the cylinder and being provided with sliding bearings in the upper head of the cylinder, an upper piston head for the piston rod working in said standpipe and having outlet ports and a valve device controlling the same, and an operating device having means of connection with said upper piston head located centrally of the head and in line with said piston rod within the valve device.

2. In a pump, a cylinder having a closed upper head, an inlet port, a piston head working in said cylinder and having inlet ports and a ring-form valve, a tubular piston rod having means of connection with said head located centrally of the head within said ring-form valve, said rod having communication at its lower end portion with the cylinder, being provided with sliding bearings in the upper head of the cylinder and having an upper outlet port and valve located without said cylinder, and means for operating the piston head and its hollow rod.

3. In a pump, a cylinder having a closed upper head, an inlet port, a piston head working in said cylinder and having an annular concave valve seat provided with perforations, a loose ring-form valve for engagement with said seat, a loose annular washer above said valve, a tubular piston rod having means of connection with said head located centrally of the head within said ring-form valve, said rod having communication at its lower end portion with the cylinder and being provided with sliding bearings in the upper head of the cylinder and having an upper outlet port and valve located without the cylinder, and means for operating said piston head and its hollow rod.

4. In a balance pump, double cylinders having each a closed upper head, an inlet port, a lower piston head working in the cylinder and having outlet ports and a valve device controlling the same, double standpipes, a tubular piston rod for each cylinder having means of connection with said head located centrally of the head within said valve device, said rod having communication at its lower end portion with the cylinder and being provided with sliding bearings in the upper head of the cylinder, an upper piston head for the piston rod working in the standpipe corresponding thereto and having outlet ports and a valve device controlling the same and vibratory operating means having opposite flexible connections with opposite hollow rods having means of connection with the upper piston heads located centrally of said heads in line with the hollow piston rods and within the valve device of each head.

5. In a pump, a cylinder having a closed upper head, an inlet port, a lower piston head working in said cylinder and having inlet ports and a ring-form valve, a standpipe, a tubular piston rod of the same diameter throughout having means of connection with said head located centrally of the head within said ring-form valve, said rod having communication at its lower end portion with the cylinder and being provided with sliding bearings in the upper head of the piston rod, an upper piston head for the cylinder working in said standpipe and having outlet ports and a ring-form valve and an operating device having means of connection with the upper piston head located centrally of and in line with said piston rod within said ring form valve.

In testimony whereof I affix my signature, in presence of two witnesses.

GEORGE A. STARR.

Witnesses:
WALTER L. TOOZE,
SADIE A. TOOZE.